United States Patent
Oota et al.

(10) Patent No.: US 10,000,081 B2
(45) Date of Patent: Jun. 19, 2018

(54) TRANSFER SHEET

(71) Applicant: Dai Nippon Printing Co., Ltd., Tokyo (JP)

(72) Inventors: Mitsuhiro Oota, Tokyo (JP); Junpei Oomura, Tokyo (JP); Yuki Iwasaki, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days. days.

(21) Appl. No.: 15/504,077

(22) PCT Filed: Sep. 17, 2015

(86) PCT No.: PCT/JP2015/076572
§ 371 (c)(1),
(2) Date: Feb. 15, 2017

(87) PCT Pub. No.: WO2016/052243
PCT Pub. Date: Apr. 7, 2016

(65) Prior Publication Data
US 2017/0282621 A1 Oct. 5, 2017

(30) Foreign Application Priority Data
Sep. 30, 2014 (JP) .................................. 2014-202100

(51) Int. Cl.
*B41M 5/382* (2006.01)
*B41M 5/44* (2006.01)
(Continued)

(52) U.S. Cl.
CPC .............. *B41J 31/06* (2013.01); *B32B 27/08* (2013.01); *B32B 27/28* (2013.01); *B41M 5/42* (2013.01);
(Continued)

(58) Field of Classification Search
CPC .... B41M 5/382; B41M 5/38214; B41M 5/42; B41M 5/44; B41M 5/443
(Continued)

(56) References Cited

U.S. PATENT DOCUMENTS

| 5,494,885 A | 2/1996 | Kudo et al. |
| 6,040,268 A | 3/2000 | Ueno et al. |
| 2015/0132510 A1 | 5/2015 | Fukunaga et al. |

FOREIGN PATENT DOCUMENTS

| JP | 07-276831 A1 | 10/1995 |
| JP | 2002-230738 A1 | 8/2002 |

(Continued)

OTHER PUBLICATIONS

English translation of the International Preliminary Report on Patentability (Application No. PCT/JP2015/076572) dated Apr. 6, 2017.

(Continued)

*Primary Examiner* — Bruce H Hess
(74) *Attorney, Agent, or Firm* — Burr & Brown, PLLC

(57) ABSTRACT

There is provided a transfer sheet with improvement in smudges and blurs of a transfer layer when printed matters are produced even after storing the transfer sheet under high temperatures. The transfer sheet according to the present invention comprises a substrate, and in the order a peel layer and a transfer layer on the substrate, wherein the peel layer contains a binder resin, a silicone oil and/or a wax component and the total contents of the silicone oil and the wax component in the peel layer is 0.1 mass % or more and 15 mass % or less, based on the solid content of mass of the binder resin.

18 Claims, 1 Drawing Sheet

(51) Int. Cl.
  *B41J 31/06*    (2006.01)
  *B41M 7/00*    (2006.01)
  *B41M 5/42*    (2006.01)
  *B32B 27/08*    (2006.01)
  *B32B 27/28*    (2006.01)
  *B41J 31/09*    (2006.01)

(52) U.S. Cl.
  CPC .............. *B41M 5/44* (2013.01); *B41M 5/443* (2013.01); *B41M 7/0027* (2013.01); *B41J 31/09* (2013.01); *B41M 5/382* (2013.01); *B41M 5/38214* (2013.01)

(58) Field of Classification Search
  USPC ........................................... 428/32.81, 32.82
  See application file for complete search history.

(56) References Cited

FOREIGN PATENT DOCUMENTS

| | | |
|---|---|---|
| JP | 2009-286040 A1 | 12/2009 |
| JP | 2011-073383 A1 | 4/2011 |
| JP | 2013-059884 A1 | 4/2013 |
| WO | 96/31355 A1 | 10/1996 |
| WO | 2014/041779 A1 | 3/2014 |

OTHER PUBLICATIONS

International Search Report and Written Opinion (Application No. PCT/JP2015/076572) dated Oct. 27, 2015.

[Fig. 1]
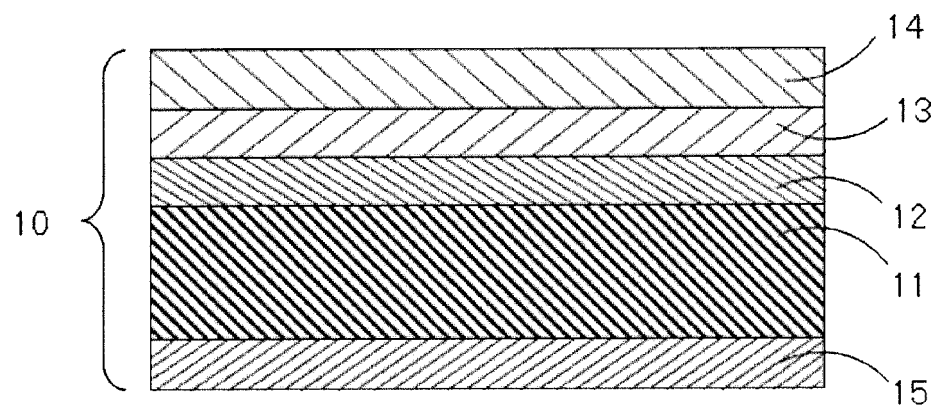
[Fig. 2]
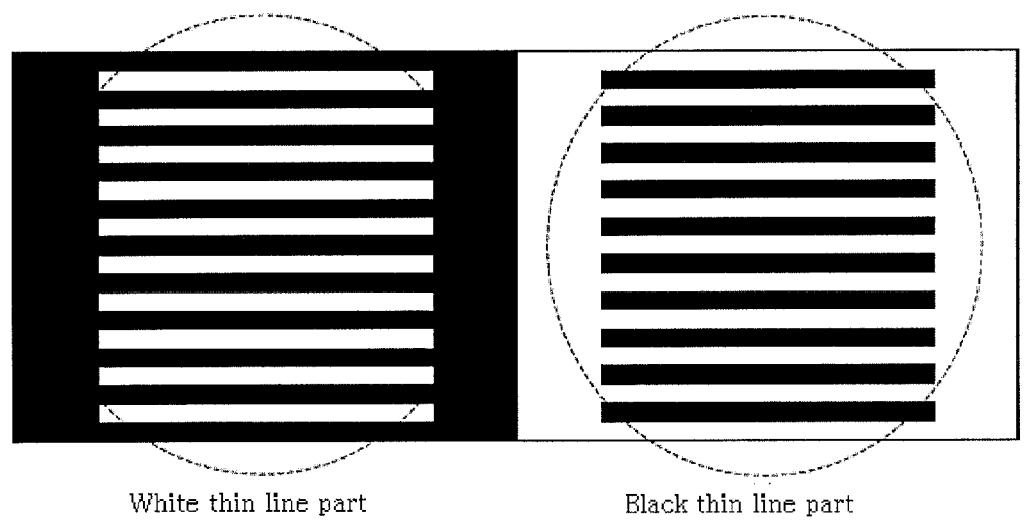
White thin line part          Black thin line part

TRANSFER SHEET

TECHNICAL FIELD

The present invention relates to a thermal transfer sheet and more particularly, to a transfer sheet comprising a substrate and in the order a peel layer and a transfer layer on the substrate.

BACKGROUND ART

Currently, thermal transfer recording methods are widely used as a convenient printing method. Since thermal transfer methods allow to form various images, they are used in printing materials which may have a relatively few printing pages, for example, in making ID cards such as identification papers and business photography, or printing machines for personal computers, and video printers.

When roughly classifying thermal transfer sheets used in thermal transfer recording methods, they are classified by a so-called fusion transfer type, in which a heat-fusion colored layer fusion-softens and the heat-fusion colored layer is transferred to an object, i.e. a receiving sheet, and a so-called sublimation transfer type, in which dyes in a colorant layer sublimate and transfer to a receiving sheet by sensing heat. When in making IDs such as identification papers, and particularly when in forming uniform images such as texts and figures, heat-fusion type thermal transfer sheets are used. A thermal transfer sheet by stacking in the order a substrate, a release layer comprising an acrylic-styrene-based resin and a heat fusion colored layer is known as an example of such heat-fusion type thermal transfer sheet. However, when an acrylic-styrene-based resin is used as the release layer of the thermal transfer sheet, the release layer softens due to the heat conveyed from a thermal head and the peel force between the release and the transfer layers becomes high, thus problems may occur such as transfer failure, where the transfer layer is not transferred, whitening of an image due to roughening of a peel interface, and abnormal noise at peeling.

Further, when IDs such as identification papers are made by using the above mentioned thermal transfer sheet, a method is known for forming a protective layer on the image by superimposing a protective layer thermal transfer sheet stacked by, in the order, a substrate, a release layer consisting of a polyvinyl alcohol (PVA) and a water-dispersible urethane, and a protective layer, on the image obtained by the thermal transfer of the heat fusion colored layer, and transferring the protective layer by using such as a thermal head or a heating roll for protection of images. Furthermore, a method for forming a lamination material is known by using the heat roll after forming the protective layer on the image for improving image durability. However, a water-based release layer (a release layer comprising a polyvinyl alcohol and a water-dispersible urethane) is unstable to moisture and especially under high moisture environment; problems may occur such as whitening of an image due to roughening of a peel interface, and abnormal noise at peeling.

In order to solve the problems as described above, it is proposed to provide a thermal transfer sheet comprising a release layer containing polyamide-based resins to reduce the heat applied to the thermal head and the effect of moisture environment and improve the peeling (refer to patent document 1).

PRIOR ART DOCUMENT

Patent Document

Patent document 1: Japanese Patent Application Laid-Open No. 2011-73383

SUMMARY OF THE INVENTION

Problems to be Solved by the Invention

However, a new technical problem was found that, in order to form images of minute texts and figures and the like, smudges and blurs of the transfer layer appear by the use of the thermal transfer sheet as described in patent document 1, especially after its storage under environment of high temperatures.

The present invention is based on considering the above technical background and the purpose is to provide a thermal transfer sheet with improvement in smudges and blurs (excellent in storage stability) of the transfer layer when printed matters are prepared even after storing the transfer layer under environment of high temperatures.

Means for Solving the Problems

The inventors have closely examined to solve the above problems and found that by using the transfer sheet comprising a peel layer of a specific composition including a binder resin, a silicone oil and/or a wax component, the above problems can be solved. The present invention has been accomplished based on such findings.

Specifically, in accordance with an embodiment of the present invention, there is provided a transfer sheet comprising a substrate; and in the order a peel layer and a transfer layer on the substrate,
wherein the peel layer contains a binder resin, a silicone oil and/or a wax component, and the total content of the silicone oil and/or the wax component in the peel layer is 0.1 mass % or more and 15 mass % or less, based on the solid content of mass of the binder resin.

Preferably, in the above described embodiment of the present invention, the peel layer contains an epoxy-modified silicone oil.

Preferably, in the above described embodiment of the present invention, the peel layer contains a polyethylene wax.

Preferably, in the above described embodiment of the present invention, the binder resins are selected from a group consisting of acrylic-based resins, vinyl-based resins, polyester-based resins, urethane-based resins, acetal-based resins, cellulose-based resins and polyvinyl alcohol-based resins.

Preferably, in the above described embodiment of the present invention, the content of the binder resin in the peel layer is 60 mass % or more and 99 mass % or less, based on the solid content of mass of the peel layer.

Preferably, in the above described embodiment of the present invention, a release layer is further comprised between the substrate and the peel layer.

Preferably, in the above described embodiment of the present invention, the transfer layer contains a colorant.

Advantageous Effects of Invention

In accordance with the present invention, a transfer sheet can be provided with improvement in smudges and blurs (excellent in storage stability) of the transfer layer when printed matters are prepared even after storing the transfer layer under environment of high temperatures.

BRIEF DESCRIPTION OF THE DRAWING

FIG. 1 is a schematic cross-sectional view showing one embodiment of the transfer sheet according to the present invention.

FIG. 2 is a figure showing printing pattern (white and black lines) under transfer conditions of evaluation of storage stability.

EMBODIMENTS FOR CARRYING OUT THE INVENTION

<Transfer Sheet>

The transfer sheet according to the present invention comprises in the order a peel layer and a transfer layer, further, a release layer may be comprised between the substrate and the peel layer and further, a heat-resistant layer may be comprised on the face of the opposite side of the peel layer of the substrate. A layer construction of the transfer sheet according to the present invention is described below with making reference to the drawings.

The schematic cross-sectional view of one embodiment of the transfer sheet according to the present invention is shown in FIG. 1. Transfer sheet 10 shown in FIG. 1 comprises in the order a substrate 11, a release layer 12 on the substrate 11, a peel layer 13, a transfer layer 14 and further a heat-resistant layer 15 on the face of the opposite side of the peel layer 12 of the substrate 11. A layer construction of the transfer sheet according to the present invention is described below in details.

<Substrate>

The substrate according to the present invention preferably has mechanical strength high enough to pose no problem in handling even in a heated state because heat is applied in thermal transfer as well as having a role to hold the transfer layer. Examples of the material for such substrate include polyethylene terephthalate films, 1,4-polycyclohexylene dimethylene terephthalate films, polyethylene naphthalate films, polyphenylene sulfide films, polystyrene films, polypropylene films, polysulfone films, aramid films, polycarbonate films, polyvinyl alcohol films, cellophane, cellulose derivatives such as cellulose acetate, polyethylene films, polyvinyl chloride films, nylon films, polyimide films, and ionomer films. Further, the thickness of the substrate is preferably 0.5 μm or more and 50 μm or less, and more preferably 1 μm or more and 10 μm or less.

A substrate with an easy-adhesion treatment on the surface may be used. The easy-adhesion treatment forms an easy-adhesion layer between the substrate and an easy-adhesion layer described below. Preferably, the easy-adhesion layer consists of, for example aqueous acrylics, aqueous polyesters and aqueous epoxy compounds. Aqueous acrylics are water-soluble or water-dispersible acrylic-based resins and preferably, the main components are alkyl acrylates or alkyl methacrylates, which are preferably 30 mol % or more and 90 mol % or less and copolymerized. Aqueous polyesters are water-soluble or water-dispersible polyester-based resins and the component constructing such polyester based resins are for example, polyvalent carboxylic acid or polyvalent hydroxyl compounds. Aqueous epoxy compounds are water-soluble or water-dispersible, preferably containing water-soluble epoxy-group, wherein at least 1 or more, preferably 2 or more of epoxy groups are contained in the molecule. Such aqueous epoxy compounds are glycidyl ether of glycols, polyethers, polyols, glycidyl ester of carboxylic acids, amines substituted by glycidyl, and preferably glycidyl ethers. Easy-adhesion treatment preferably uses a method to form an easy-adhesion coating on the surface of the substrate.

<Release Layer>

The release layer according to the present invention is a layer provided so that the transfer layer can easily peel off from substrate when thermally transferred. The release layer is preferably formed of a material having releaseability which for example, preferably comprises a binder resin and additives such as a release agent and the like. Binder resins include such as urethane-based resins, acetal-based resins, polyamide-based resins, melamine-based resins, polyol resins, cellulose resins and polyvinyl alcohols and preferably, urethane-based resins and acetal-based resins are used. Release agents include such as silicone oils, phosphoric ester based plasticizers, fluorine-based compounds, waxes, metal soaps and fillers and preferably, silicone oils are used.

The method to form the release layer is not particularly limited and it may be formed by a conventionally known coating method. For example, it may be formed by adding the above mentioned binder resins and if necessary, additives such as release agents to an appropriate solvent and after preparing a coating liquid by dissolving or dispersing each component, applying the coating liquid on to the substrate by using known methods such as gravure coating, roll coating, comma coating, gravure printing, screen printing and gravure reverse roll coating, and drying. Further, the thickness of the release layer is, without limitation, preferably 0.05 μm or more and 5.0 μm or less, and more preferably 0.1 μm or more and 3 μm or less.

<Peel Layer>

The peel layer according to the present invention is a layer provided so that transfer layer can peel off easily from the substrate when thermally transferred. The peel layer comprises a binder resin and a peeling agent. The content of the peel layer in (total content of a silicone oil and a wax component) in the peel layer is 0.1 mass % or more and 15 mass % or less, preferably 0.5 mass % or more and 12 mass % or less, more preferably 1 mass % or more and 10 mass % or less, based on the solid content of mass of the binder resin. If the content of the peel agent is within the above range, a transfer sheet can be obtained with improvement in smudges and blurs (excellent in storage stability) of the transfer layer when printed matters are prepared even after storing the transfer sheet under environment of high temperatures.

Silicone oils and/or wax components are used as a peel agent. Silicone oils include, such as amino-modified silicones, epoxy-modified silicones, aralkyl-modified silicones, epoxy-aralkyl-modified silicones, alcohol-modified silicones, vinyl-modified silicones, and urethane-based silicones, and preferably, epoxy-modified silicone oils are used. A variety of waxes are referred to as wax components, for example, microcrystalline wax, carnauba wax, paraffin wax, Fischer-Tropsch wax, various low molecular weight polyethylenes, tree wax, beeswax, spermaceti, insect wax, wool wax, shellac wax, candelilla wax, petro lactam, partially denatured waxes, fatty acid esters and fatty acid amides, and preferably, polyethylene waxes are used.

The content of the binder resin in the peel layer is preferably 6 mass % or more and 99 mass % or less, more preferably 70 mass % or more and 95 mass % or less, and even more preferably 80 mass % or more and 90 mass % or less, based on the solid content of mass of the peel layer. If the content of the peel agents are within the above range, a transfer sheet can be obtained with improvement in smudges and blurs (excellent storage stability) of the transfer layer when printed matters are prepared, even after storing the transfer sheet under environment of high temperatures.

Binder resins used in the peel layer include: acrylic-based resins such as poly(meth)acrylates and poly(meth)acryl amides; vinyl-based resins such as polyvinyl alcohol resins, polyvinyl acetate resins, vinyl chloride-vinyl acetate copolymers (vinyl chloride-vinyl acetate copolymer resins), polyvinyl butyral resins, polyvinyl acetal resins and polyvinyl pyrrolidones; polyester-based resins such as polyethylene terephthalate resins and polyethylene naphtalate resins; urethane-based resins such as polyurethane acrylate; cellulose-based resins such as ethylcellulose resins, hydroxyethylcellulose resins, ethylhydroxycellulose resins, methylcellulose resins and ethyl acetate cellulose resins; polyamide-based resins such as polyamide resins, aromatic polyamide resins and polyamide imide resins; acetal-based resins; and polycarbonate-based resins and preferably, acrylic-based resins, vinyl-based resins, polyester-based resins, urethane-based resins, acetal-based resins and cellulose-based resins are used.

In the present invention, the acrylic-based resins include polymers or its derivatives of monomers of (meth) acrylate, polymers or its derivatives of monomers of (meth) acrylate ester, copolymers or its derivatives of monomers of (meth) acrylic and other monomers, and copolymers or its derivatives of (meth) acrylate ester and other monomers. Other "based resins" also may include copolymers or its derivatives of other monomers other than the main components.

The method to form the peel layer is not particularly limited and it may be formed by a conventionally known coating method. For example, it may be formed by adding the above mentioned binder resin and if necessary, additives such as a peel agent to an appropriate solvent and after preparing a coating liquid by dissolving or dispersing each component, applying the coating liquid on to the substrate or the release layer by using known methods such as gravure coating, roll coating, comma coating, gravure printing, screen printing and gravure reverse roll coating, and drying. The thickness of the peel layer is, without particular limitation, preferably 0.05 µm or more and 5.0 µm or less, and more preferably 0.1 µm or more and 3 µm or less.

<Transfer Layer>

The transfer layer according to the present invention is a layer peeled off from the release layer and/or the peel layer and transferred on to the object by superimposing the transfer sheet and the object, and heating the back face side (the side not provided with the transfer layer of the substrate) of the substrate by conventionally known heating methods, such as printing machines with thermal heads for thermal transfer.

The transfer layer preferably comprises a binder resin and a colorant in order to be transferred onto the object and to form images such as texts and figures. Binder resins used for the transfer layer include: acrylic-based resins such as poly(meth)acrylates and poly(meth)acrylamides; vinyl-based resins such as polyvinyl alcohol resins, polyvinyl acetate resins, vinyl chloride-vinyl acetate resins, polyvinyl butyral resins, polyvinyl acetal resins and polyvinyl pyrrolidones; urethane-based resins such as polyurethane acrylate; cellulose-based resins such as ethylcellulose resins, hydroxyethylcellulose resins, ethylhydroxycellulose resins, methylcellulose resins, cellulose acetate resins; polyamide-based resins such as polyamide resins, aromatic polyamide resins and polyamide imide resins; acetal-based resins; and polycarbonate-based resins and preferably, vinyl-based resins are used.

Conventionally known colorants may be used as a colorant, however preference is made to those having good properties for printed materials, for example with sufficient color density and no changes or bleaching out of colors by light, heat or temperatures and the like. Further, substances such as those developing colors by applying heat or by contacting with the component coated onto the surface of the subject may also be used. Colorants may be of those expressing at least one color selected from the group consisting of black, white, silver, cyan, magenta, yellow, red, green, and blue. Preferably, for example, carbon black for black; titanium oxide for white; and inorganic materials such as alminium for silver; and respective pigments described in C.I. Pigment for cyan, magenta, yellow, red, green, and blue, are used as a colorant.

The method to form the transfer layer is not particularly limited and it may be formed by a conventionally known coating method. For example, it may be formed by adding the above mentioned binder resin and if necessary, additives such as a peel agent to an appropriate solvent and after preparing a coating liquid by dissolving or dispersing each component, applying the coating liquid on to the peel layer by using known methods such as gravure coating, roll coating, comma coating, gravure printing, screen printing and gravure reverse roll coating, and drying. Further, the thickness of the transfer layer is, without particular limitation, preferably 0.5 µm or more and 30 µm or less, and more preferably 1 µm or more and 20 µm or less.

<Heat-Resistant Layer>

The heat-resistant layer according to the present invention is a layer provided to prevent the negative effects such as sticking and crinkles due to the applied heat from the back face side of the substrate (the side without the transfer sheet of the substrate) when thermally transferred. Providing the heat-resistant layer will make it possible to thermally print without sticking in the thermal transfer sheet with plastic films, which is poor in heat-resistance, as substrate and make good use of the advantages the plastic films have, such as shred-resistance and easy processing.

Preferably, the heat-resistant layer contains a binder resin and additives such as a slipping agent. Binder resins used for the transfer layer include: acrylic-based resins such as poly(meth)acrylates and poly(meth)acrylamides; vinyl-based resins such as polyvinyl alcohol resins, polyvinyl acetate resins, vinyl chloride-vinyl acetate resins, polyvinyl butyral resins, polyvinyl acetal resins and polyvinyl pyrrolidones; polyester-based resins such as polyethylene terephthalate resins and polyethylene naphtalate resins; urethane-based resins such as polyurethane acrylate; cellulose-based resins such as ethylcellulose resins, hydroxyethylcellulose resins, ethylhydroxycellulose resins, methylcellulose resins and ethyl acetate cellulose resins; polyamide-based resins such as polyamide resins, aromatic polyamide resins and polyamide imide resins; acetal-based resins; and polycarbonate-based resins. Slipping agents include such as metal soaps, waxes, silicone oils, fatty acid esters, fillers and talc.

The method to form the heat-resistant layer is not particularly limited and it may be formed by a conventionally known coating method. For example, it may be formed by adding the above described binder resin and if necessary, additives such as a slipping agent to an appropriate solvent and after preparing a coating liquid by dissolving or dispersing each component, applying the coating liquid onto the peel layer by using known methods such as gravure coating, roll coating, comma coating, gravure printing, screen printing and gravure reverse roll coating, and drying. Further, the thickness of the heat-resistant layer is, without particular limitation, preferably 0.05 µm or more and 5.0 µm or less, and more preferably 0.1 µm or more and 3 µm or less.

<Object>

The object which may be used for the transfer of the thermal transfer sheet according to the present invention include for example, but without particular limitation, those provided with a receptive layer which is pigment-recipient on the conventionally known substrate. Substrates for the object may include for example, but without particular limitation, plain papers, high-quality papers, tracing papers and plastic films. The receptive layer in the above described object may be formed by forming methods such as coating, thermal heads or thermal rolls. When the substrate itself is pigment-recipient, the receptive layer is not necessary to be provided for the object.

<Transfer Method>

Transfer of the transfer layer to the object by a thermal transfer method using the transfer sheet according to the present invention may be performed directly onto the object (direct) or by transferring onto a receptive layer provided by an intermediate transfer recording medium (primary transfer) and then transferring the receptive layer of the intermediate transfer recording medium onto the object (retransfer), by using conventionally known thermal transfer printing machines. Transfer conditions for the thermal transfer printing machines may be set separately like for example, for sublimation transfer, for heat-fusion transfer or for protective layer transfer or printing energy may be appropriately adjusted respectively in a common printing machine. In addition, transfer can be performed by using heating methods such as, without particular limitation, thermal heads, hot plates, hot stampers, heat rolls, line heaters or irons.

EXAMPLES

The present invention is further illustrated by the following Examples and Comparative Examples that are not intended as a limitation of the invention. Mass parts of the binder resins, silicone oils and wax components are described in solid content.

Example 1

A 6 µm-thick easy-adhesion treated polyester film was prepared as a substrate. A heat-resistant layer was formed by coating a coating liquid 1, having the following composition for the heat-resistant layer, onto the surface untreated with easy-adhesion of the said polyester film so that the coverage will be 1.0 g/m² when dried. Then, a peel layer was formed by coating a coating liquid 1, having the following composition for the peel layer, onto the release layer so that the coverage will be 1.0 g/m² when dried. Then, a transfer sheet 1 was produced by forming the transfer layer by coating a coating liquid, having the following composition for the transfer layer, onto the peel layer so that the coverage will be 1.0 g/m² when dried.

<Coating Liquid 1 for Heat-resistant Layer>

| | |
|---|---|
| Polyvinylbutyral resin (manufactured by Sekisui Chemical Co., Ltd., product name: S-LEC BX-1) | 2.0 parts |
| Isocyanate (manufactured by DIC, product name: BURNOCK D750) | 4.4 parts |
| Phosphoric ester-based surfactant (manufactured by Dai-Ichi Kogyo Seiyaku, product name: Plysurf A208N) | 1.3 parts |
| Talc (manufactured by Nippon Talc Co., Ltd., product name: Microace P-3) | 0.3 part |
| Viscosity adjusting solvent (Toluene/Methyl ethyl ketone = 1/1) | 92 parts |

<Coating Liquid 1 for Release Layer>

| | |
|---|---|
| Urethane-based resin | 25 parts |
| Acetal-based resin (manufactured by Sekisui Chemical Co., Ltd., product name: S-LECK KS-5) | 75 parts |
| Viscosity adjusting solvent (Toluene/Isopropyl alcohol = 1/1) | 1900 parts |

<Coating Liquid 1 for Peel Layer>

| | |
|---|---|
| Acrylic-based resin (manufactured by MITSUBISHI RAYON Co., Ltd., product name: BR-85) | 100 parts |
| Polyethylene wax | 1 part |
| Viscosity adjusting solvent (Toluene/Methyl ethyl ketone = 1/1) | 300 parts |

<Coating Liquid 1 for Transfer Layer>

| | |
|---|---|
| Vinyl chloride-vinyl acetate copolymer | 60 parts |
| Carbon black | 40 parts |
| Viscosity adjusting solvent (Toluene/Methyl ethyl ketone = 1/1) | 200 parts |

Example 2

Transfer sheet 2 was produced in the similar way as Example 1, except that the composition of the coating liquid for the peel layer was made as follows.

<Coating Liquid 2 for Peel Layer>

| | |
|---|---|
| Acrylic-based resin (manufactured by MITSUBISHI RAYON Co., Ltd., product name: BR-85) | 100 parts |
| Epoxy-modified silicone oil (manufactured by Shin-Etsu Chemical Co., Ltd., product name: KP-1800U) | 1 part |
| Viscosity adjusting solvent (Toluene/Methyl ethyl ketone = 1/1) | 300 parts |

Example 3

Transfer sheet 3 was produced in the similar way as Example 1, except that the composition of the coating liquid for the peel layer was made as follows.

<Coating Liquid 3 for Peel Layer>

| | |
|---|---|
| Acrylic-based resin (manufactured by MITSUBISHI RAYON Co., Ltd., product name: BR-85) | 100 parts |
| Epoxy-modified silicone oil (manufactured by Shin-Etsu Chemical Co., Ltd., product name: KP-1800U) | 2 parts |
| Polyethylene wax | 2 parts |
| Viscosity adjusting solvent (Toluene/Methyl ethyl ketone = 1/1) | 300 parts |

Example 4

Transfer sheet 4 was produced in the similar way as Example 1, except that the composition of the coating liquid for the peel layer was made as follows.

<Coating Liquid 4 for Peel Layer>

| | |
|---|---|
| Acrylic-based resin (manufactured by MITSUBISHI RAYON Co., Ltd., product name: BR-85) | 100 parts |
| Epoxy-modified silicone oil (manufactured by Shin-Etsu Chemical Co., Ltd., product name: KP-1800U) | 3 parts |
| Polyethylene wax | 4 parts |
| Viscosity adjusting solvent (Toluene/Methyl ethyl ketone = 1/1) | 300 parts |

Example 5

Transfer sheet 5 was produced in the similar way as Example 1, except that the composition of the coating liquid for the peel layer was made as follows.

<Coating Liquid 5 for Peel Layer>

| | |
|---|---|
| Acrylic-based resin (manufactured by MITSUBISHI RAYON Co., Ltd., product name: BR-85) | 100 parts |
| Epoxy-modified silicone oil (manufactured by Shin-Etsu Chemical Co., Ltd., product name: KP-1800U) | 10 parts |
| Polyethylene wax | 5 parts |
| Viscosity adjusting solvent (Toluene/Methyl ethyl ketone = 1/1) | 300 parts |

Example 6

Transfer sheet 6 was produced in the similar way as Example 1, except that the composition of the coating liquid for the peel layer was made as follows.

<Coating Liquid 6 for Peel Layer>

| | |
|---|---|
| Vinyl chloride-vinyl acetate resin (manufactured by Nissin Chemical Industry Co., Ltd., product name: Solbin CNL) | 100 parts |
| Polyethylene wax | 2 parts |
| Viscosity adjusting solvent (Toluene/Methyl ethyl ketone = 1/1) | 300 parts |

Example 7

Transfer sheet 7 was produced in the similar way as Example 1, except that the composition of the coating liquid for the peel layer was made as follows.

<Coating Liquid 7 for Peel Layer>

| | |
|---|---|
| Vinyl chloride-vinyl acetate resin (manufactured by Nissin Chemical Industry Co., Ltd., product name: Solbin CNL) | 100 parts |
| Epoxy-modified silicone oil (manufactured by Shin-Etsu Chemical Co., Ltd., product name: KP-1800U) | 2 parts |
| Viscosity adjusting solvent (Toluene/Methyl ethyl ketone = 1/1) | 300 parts |

Example 8

Transfer sheet 8 was produced in the similar way as Example 1, except that the composition of the coating liquid for the peel layer was made as follows.

<Coating Liquid 8 for Peel Layer>

| | |
|---|---|
| Vinyl chloride-vinyl acetate resin (manufactured by Nissin Chemical Industry Co., Ltd., product name: Solbin CNL) | 100 parts |
| Epoxy-modified silicone oil (manufactured by Shin-Etsu Chemical Co., Ltd., product name: KP-1800U) | 2 parts |
| Polyethylene wax | 5 parts |
| Viscosity adjusting solvent (Toluene/Methyl ethyl ketone = 1/1) | 300 parts |

Example 9

Transfer sheet 9 was produced in the similar way as Example 1, except that the composition of the coating liquid for the peel layer was made as follows.

<Coating Liquid 9 for Peel Layer>

| | |
|---|---|
| Vinyl chloride-vinyl acetate resin (manufactured by Nissin Chemical Industry Co., Ltd., product name: Solbin CNL) | 100 parts |
| Epoxy-modified silicone oil (manufactured by Shin-Etsu Chemical Co., Ltd., product name: KP-1800U) | 3 parts |
| Polyethylene wax | 5 parts |
| Viscosity adjusting solvent (Toluene/Methyl ethyl ketone = 1/1) | 300 parts |

Example 10

Transfer sheet 10 was produced in the similar way as Example 1, except that the composition of the coating liquid for the peel layer was made as follows.

<Coating Liquid 10 for Peel Layer>

| | |
|---|---|
| Vinyl chloride-vinyl acetate resin (manufactured by Nissin Chemical Industry Co., Ltd., product name: Solbin CNL) | 100 parts |
| Epoxy-modified silicone oil (manufactured by Shin-Etsu Chemical Co., Ltd., product name: KP-1800U) | 5 parts |
| Polyethylene wax | 10 parts |
| Viscosity adjusting solvent (Toluene/Methyl ethyl ketone = 1/1) | 300 parts |

Example 11

Transfer sheet 11 was produced in the similar way as Example 1, except that the composition of the coating liquid for the peel layer was made as follows.

<Coating Liquid 11 for Peel Layer>

| | |
|---|---|
| Polyester-based resin (manufactured by TOYOBO Co., Ltd., product name: VYLON 220) | 100 parts |
| Polyethylene wax | 3 parts |
| Viscosity adjusting solvent (Toluene/Methyl ethyl ketone = 1/1) | 300 parts |

Example 12

Transfer sheet 12 was produced in the similar way as Example 1, except that the composition of the coating liquid for the peel layer was made as follows.

<Coating Liquid 12 for Release Layer>

| | |
|---|---|
| Polyester-based resin (manufactured by TOYOBO Co., Ltd., product name: VYLON 220) | 100 parts |
| Epoxy-modified silicone oil (manufactured by Shin-Etsu Chemical Co., Ltd., product name: KP-1800U) | 1 part |
| Polyethylene wax | 5 parts |
| Viscosity adjusting solvent (Toluene/Methyl ethyl ketone = 1/1) | 300 parts |

Example 13

Transfer sheet 13 was produced in the similar way as Example 1, except that the composition of the coating liquid for the peel layer was made as follows.

<Coating Liquid 13 for Peel Layer>

| | |
|---|---|
| Polyester-based resin (manufactured by TOYOBO Co., Ltd., product name: VYLON 220) | 100 parts |
| Epoxy-modified silicone oil (manufactured by Shin-Etsu Chemical Co., Ltd., product name: KP-1800U) | 1 part |
| Polyethylene wax | 4 parts |
| Viscosity adjusting solvent (Toluene/Methyl ethyl ketone = 1/1) | 300 parts |

Example 14

Transfer sheet 14 was produced in the similar way as Example 1, except that the composition of the coating liquid for the peel layer was made as follows.

<Coating Liquid 14 for Peel Layer>

| | |
|---|---|
| Polyester-based resin (manufactured by TOYOBO Co., Ltd., product name: VYLON 220) | 100 parts |
| Epoxy-modified silicone oil (manufactured by Shin-Etsu Chemical Co., Ltd., product name: KP-1800U) | 2 parts |
| Polyethylene wax | 4 parts |
| Viscosity adjusting solvent (Toluene/Methyl ethyl ketone = 1/1) | 300 parts |

Example 15

Transfer sheet 15 was produced in the similar way as Example 1, except that the composition of the coating liquid for the peel layer was made as follows.

<Coating Liquid 15 for Peel Layer>

| | |
|---|---|
| Polyester-based resin (manufactured by TOYOBO Co., Ltd., product name: VYLON 220) | 100 parts |
| Epoxy-modified silicone oil (manufactured by Shin-Etsu Chemical Co., Ltd., product name: KP-1800U) | 7 parts |
| Polyethylene wax | 8 parts |
| Viscosity adjusting solvent (Toluene/Methyl ethyl ketone = 1/1) | 300 parts |

Example 16

Transfer sheet 16 was produced in the similar way as Example 1, except that the composition of the coating liquid for the peel layer was made as follows.

<Coating Liquid 16 for Peel Layer>

| | |
|---|---|
| Urethane-based resin (manufactured by DIC, product name: NY-373) | 100 parts |
| Epoxy-modified silicone oil (manufactured by Shin-Etsu Chemical Co., Ltd., product name: KP-1800U) | 3 parts |
| Polyethylene wax | 4 parts |
| Viscosity adjusting solvent (Toluene/Methyl ethyl ketone = 1/1) | 300 parts |

Example 17

Transfer sheet 17 was produced in the similar way as Example 1, except that the composition of the coating liquid for the peel layer was made as follows.

<Coating Liquid 17 for Peel Layer>

| | |
|---|---|
| Acetal-based resin (manufactured by Sekisui Chemical Co., Ltd., product name: S-LEC K KS-5) | 100 parts |
| Epoxy-modified silicone oil (manufactured by Shin-Etsu Chemical Co., Ltd., product name: KP-1800U) | 4 parts |
| Polyethylene wax | 5 parts |
| Viscosity adjusting solvent (Toluene/Methyl ethyl ketone = 1/1) | 300 parts |

Example 18

Transfer sheet 18 was produced in the similar way as Example 1, except that the composition of the coating liquid for the peel layer was made as follows.

<Coating Liquid 18 for Peel Layer>

| | |
|---|---|
| Cellulose-based resin (manufactured by Eastman Chemical Company, product name: CAB-381-0.5) | 100 parts |
| Epoxy-modified silicone oil (manufactured by Shin-Etsu Chemical Co., Ltd., product name: KP-1800U) | 5 parts |
| Polyethylene wax | 5 parts |
| Viscosity adjusting solvent (Toluene/Methyl ethyl ketone = 1/1) | 300 parts |

Example 19

Transfer sheet 19 was produced in the similar way as Example 1, except that the composition of the coating liquid for the peel layer was made as follows.

<Coating Liquid 19 for Peel Layer>

| | |
|---|---|
| Polyvinyl alcohol (PVA) resin (manufactured by Nippon Synthetic Chemical Industry Co., Ltd., product name: Gohsenol C-500) | 100 parts |
| Polyethylene wax | 10 parts |
| Viscosity adjusting solvent (Water/Isopropyl alcohol = 1/1) | 300 parts |

Comparative Example 1

Transfer sheet 20 was produced in the similar way as Example 1, except that the composition of the coating liquid for the peel layer was made as follows.

<Coating Liquid 20 for Peel Layer>

| | |
|---|---|
| Acrylic-based resin (manufactured by MITSUBISHI RAYON Co., Ltd., product name: BR-85) | 100 parts |

-continued

| | |
|---|---|
| Viscosity adjusting solvent (Toluene/Methyl ethyl ketone = 1/1) | 300 parts |

Comparative Example 2

Transfer sheet 21 was produced in the similar way as Example 1, except that the composition of the coating liquid for the peel layer was made as follows.
<Coating Liquid 21 for Peel Layer>

| | |
|---|---|
| Vinyl chloride-vinyl acetate resin (manufactured by Nissin Chemical Industry Co., Ltd., product name: Solbin CNL) | 100 parts |
| Viscosity adjusting solvent (Toluene/Methyl ethyl ketone = 1/1) | 300 parts |

Comparative Example 3

Transfer sheet 22 was produced in the similar way as Example 1, except that the composition of the coating liquid for the peel layer was made as follows.
<Coating Liquid 22 for Peel Layer>

| | |
|---|---|
| Polyester-based resin (manufactured by TOYOBO Co., Ltd., product name: VYLON 220) | 100 parts |
| Viscosity adjusting solvent (Toluene/Methyl ethyl ketone = 1/1) | 300 parts |

Comparative Example 4

Transfer sheet 23 was produced in the similar way as Example 1, except that the composition of the coating liquid for the peel layer was made as follows.
<Coating Liquid 23 for Peel Layer>

| | |
|---|---|
| Polyester-based resin (manufactured by TOYOBO Co., Ltd., product name: VYLON 220) | 100 parts |
| Polyethylene wax | 20 parts |
| Viscosity adjusting solvent (Toluene/Methyl ethyl ketone = 1/1) | 300 parts |

Comparative Example 5

Transfer sheet 24 was produced in the similar way as Example 1, except that the composition of the coating liquid for the peel layer was made as follows.
<Coating Liquid 24 for Peel Layer>

| | |
|---|---|
| Vinyl chloride-vinyl acetate resin (manufactured by Nissin Chemical Industry Co., Ltd., product name: Solbin CNL) | 100 parts |
| Epoxy-modified silicone oil (manufactured by Shin-Etsu Chemical Co., Ltd., product name: KP-1800U) | 7 parts |
| Polyethylene wax | 10 parts |
| Viscosity adjusting solvent (Toluene/Methyl ethyl ketone = 1/1) | 300 parts |

Comparative Example 6

Transfer sheet 25 was produced in the similar way as Example 1, except that the composition of the coating liquid for the peel layer was made as follows.
<Coating Liquid 25 for Peel Layer>

| | |
|---|---|
| Polyester-based resin (manufactured by TOYOBO Co., Ltd., product name: VYLON 220) | 100 parts |
| Polyethylene wax | 20 parts |
| Viscosity adjusting solvent (Toluene/Methyl ethyl ketone = 1/1) | 300 parts |

Comparative Example 7

Transfer sheet 26 was produced in the similar way as Example 1, except that the composition of the coating liquid for the peel layer was made as follows.
<Coating Liquid 26 for Release Layer>

| | |
|---|---|
| Cellulose-based resin (manufactured by Eastman Chemical Company, product name: CAB-381-0.5) | 100 parts |
| Epoxy-modified silicone oil (manufactured by Shin-Etsu Chemical Co., Ltd., product name: KP-1800U) | 8 parts |
| Polyethylene wax | 8 parts |
| Viscosity adjusting solvent (Toluene/Methyl ethyl ketone = 1/1) | 300 parts |

Comparative Example 8

Transfer sheet 27 was produced in the similar way as Example 1, except that the composition of the coating liquid for the peel layer was made as follows.
<Coating Liquid 27 for Release Layer>

| | |
|---|---|
| Acrylic-based resin (manufactured by MITSUBISHI RAYON Co., Ltd., product name: BR-85) | 100 parts |
| Epoxy-modified silicone oil (manufactured by Shin-Etsu Chemical Co., Ltd., product name: KP-1800U) | 10 parts |
| Polyethylene wax | 8 parts |
| Viscosity adjusting solvent (Toluene/Methyl ethyl ketone = 1/1) | 300 parts |

Comparative Example 9

Transfer sheet 28 was produced in the similar way as Example 1, except that the composition of the coating liquid for the peel layer was made as follows.
<Coating Liquid 28 for Release Layer>

| | |
|---|---|
| Acrylic-based resin (manufactured by MITSUBISHI RAYON Co., Ltd., product name: BR-85) | 100 parts |
| Epoxy-modified silicone oil (manufactured by Shin-Etsu Chemical Co., Ltd., product name: KP-1800U) | 10 parts |
| Polyethylene wax | 10 parts |
| Viscosity adjusting solvent (Toluene/Methyl ethyl ketone = 1/1) | 300 parts |

Comparative Example 10

Transfer sheet 29 was produced in the similar way as Example 1, except that the composition of the coating liquid for the peel layer was made as follows.

<Coating Liquid 29 for Release Layer>

| | |
|---|---|
| Acetal-based resin (manufactured by Sekisui Chemical Co., Ltd., product name: S-LEC K KS-5) | 100 parts |
| Epoxy-modified silicone oil (manufactured by Shin-Etsu Chemical Co., Ltd., product name: KP-1800U) | 13 parts |
| Polyethylene wax | 6 parts |
| Viscosity adjusting solvent (Toluene/Methyl ethyl ketone = 1/1) | 300 parts |

Comparative Example 11

Transfer sheet 29 was produced in the similar way as Example 1, except that the composition of the coating liquid for the peel layer was made as follows.

<Coating Liquid 30 for Release Layer>

| | |
|---|---|
| Vinyl chloride-vinyl acetate resin (manufactured by Nissin Chemical Industry Co., Ltd., product name: Solbin CNL) | 100 parts |
| Silicone oil (manufactured by Shin-Etsu Chemical Co., Ltd., product name: KP-1800U) | 20 parts |
| Viscosity adjusting solvent (Toluene/Methyl ethyl ketone = 1/1) | 300 parts |

The compositions of the peel layers formed in the above described Examples and Comparative Examples are indicated in Table 1.

TABLE 1

| | Type of binder resin in peel layer | Content of each component in peel layer (part by mass) | | |
|---|---|---|---|---|
| | | Binder resin | Silicone oil | Wax component |
| Example 1 | Acrylic-base | 100 | 0 | 1 |
| Example 2 | Acrylic-base | 100 | 1 | 0 |
| Example 3 | Acrylic-base | 100 | 2 | 2 |
| Example 4 | Acrylic-base | 100 | 3 | 4 |
| Example 5 | Acrylic-base | 100 | 10 | 5 |
| Example 6 | Vinyl chloride-vinyl acetate | 100 | 0 | 2 |
| Example 7 | Vinyl chloride-vinyl acetate | 100 | 2 | 0 |
| Example 8 | Vinyl chloride-vinyl acetate | 100 | 2 | 5 |
| Example 9 | Vinyl chloride-vinyl acetate | 100 | 3 | 5 |
| Example 10 | Vinyl chloride-vinyl acetate | 100 | 5 | 10 |
| Example 11 | Polyester-base | 100 | 0 | 3 |
| Example 12 | Polyester-base | 100 | 1 | 5 |
| Example 13 | Polyester-base | 100 | 1 | 4 |
| Example 14 | Polyester-base | 100 | 2 | 4 |
| Example 15 | Polyester-base | 100 | 7 | 8 |
| Example 16 | Urethane-base | 100 | 3 | 4 |
| Example 17 | Acetal-base | 100 | 4 | 5 |
| Example 18 | Cellulose-base | 100 | 5 | 5 |
| Example 19 | PVA | 100 | 0 | 10 |
| Comparative Example 1 | Acrylic-base | 100 | 0 | 0 |
| Comparative Example 2 | Vinyl chloride-vinyl acetate | 100 | 0 | 0 |
| Comparative Example 3 | Polyester-base | 100 | 0 | 0 |
| Comparative Example 4 | Polyester-base | 100 | 0 | 20 |
| Comparative Example 5 | Vinyl chloride-vinyl acetate | 100 | 7 | 10 |
| Comparative Example 6 | Polyester-base | 100 | 5 | 15 |
| Comparative Example 7 | Cellulose-base | 100 | 8 | 8 |
| Comparative Example 8 | Acrylic-base | 100 | 10 | 8 |
| Comparative Example 9 | Acrylic-base | 100 | 10 | 10 |
| Comparative Example 10 | Acetal-base | 100 | 13 | 6 |
| Comparative Example 11 | Vinyl chloride-vinyl acetate | 100 | 20 | 0 |

[Performance Evaluation of the Transfer Sheet]

Storage stability was evaluated with respect to the transfer sheets produced in the above described Examples and Comparative Examples.

[Evaluation of Storage Stability]

The transfer sheets produced in the above described Examples and Comparative Examples were stored for 96 hours under a 50° C. dry environment. Printed materials were prepared using the transfer sheets before and after storage respectively and a test printing machine (thermal head; manufactured by KYOCERA Corporation, product name: KEE-5712GAN2-STA) and transferring under the following transfer conditions onto polyvinyl chloride made cards. Thin line reproducibility was evaluated by, calculating the area ratio of the white colored and the black colored thin line part of the printed materials prepared by using the transfer sheet after storage, against the area of the white colored and the black colored thin line part of the printed materials prepared by using the transfer sheet before storage.

<Transfer Conditions>

Printing conditions: 3.0 msec/line, 18.5V
Printing patterns: indicated in FIG. 2 (white and black lines)
Object: polyvinyl chloride made card Evaluation results of the above are indicated in Table 2. The better the reproducibility of the white line, smudges were less in the printed materials and the better the reproducibility of the black line, blurs were less in the printed materials. It was found that by using the transfer sheet according to the present invention, the printed materials produced have excellent reproducibility of the white and the black color lines, in other words, smudges and blurs were less (have excellent storage stability) in the printed materials, even after storing the transfer sheets under high temperature environment.

TABLE 2

| | Storage stability | |
|---|---|---|
| | White thin line (%) | Black thin line (%) |
| Example 1 | 119 | 82 |
| Example 2 | 115 | 84 |
| Example 3 | 99 | 97 |
| Example 4 | 100 | 99 |
| Example 5 | 115 | 81 |
| Example 6 | 98 | 98 |
| Example 7 | 99 | 99 |
| Example 8 | 99 | 98 |
| Example 9 | 100 | 100 |
| Example 10 | 117 | 82 |

TABLE 2-continued

| | Storage stability | |
|---|---|---|
| | White thin line (%) | Black thin line (%) |
| Example 11 | 110 | 83 |
| Example 12 | 97 | 97 |
| Example 13 | 96 | 98 |
| Example 14 | 99 | 99 |
| Example 15 | 118 | 80 |
| Example 16 | 100 | 100 |
| Example 17 | 100 | 98 |
| Example 18 | 107 | 88 |
| Example 19 | 118 | 81 |
| Comparative Example 1 | 175 | 29 |
| Comparative Example 2 | 170 | 37 |
| Comparative Example 3 | 175 | 25 |
| Comparative Example 4 | 135 | 61 |
| Comparative Example 5 | 128 | 73 |
| Comparative Example 6 | 138 | 63 |
| Comparative Example 7 | 121 | 75 |
| Comparative Example 8 | 123 | 69 |
| Comparative Example 9 | 135 | 67 |
| Comparative Example 10 | 135 | 70 |
| Comparative Example 11 | 133 | 72 |

DESCRIPTION OF REFERENCE CHARACTERS

10 Transfer sheet
11 Substrate
12 Release layer
13 Peel layer
14 Transfer layer
15 Heat-resistant layer

The invention claimed is:

1. A transfer sheet comprising a substrate, and a peel layer and a transfer layer on the substrate in this order, wherein the peel layer contains a binder resin, a silicone oil and a wax component, the total content of the silicone oil and the wax component in the peel layer is 0.1 mass % or more and 15 mass % or less, based on the solid content mass of the binder resin, the silicone oil is an epoxy-modified silicone oil, and the wax component is a polyethylene wax.

2. The transfer sheet according to claim 1, wherein the binder resin is at least one selected from the group consisting of acrylic-based resins, vinyl-based resins, polyester-based resins, urethane-based resins, acetal-based resins and cellulose-based resins.

3. The transfer sheet according to claim 2, wherein the content of the binder resin in the peel layer is 60 mass % or more and 99 mass % or less, based on the solid content mass of the peel layer.

4. The transfer sheet according to claim 2, further comprising a release layer between the substrate and the peel layer.

5. The transfer sheet according to claim 2, wherein the transfer layer contains a colorant.

6. The transfer sheet according to claim 2, wherein the total amount of the silicone oil and the wax component in the peel layer is 1 mass % or more and 10 mass % or less, based on the solid content of mass of the binder resin.

7. The transfer sheet according to claim 2, wherein the total amount of the silicone oil and the wax component in the peel layer is 4 mass % or more and 9 mass % or less, based on the solid content of mass of the binder resin.

8. The transfer sheet according to claim 1, wherein the content of the binder resin in the peel layer is 60 mass % or more and 99 mass % or less, based on the solid content mass of the peel layer.

9. The transfer sheet according to claim 8, further comprising a release layer between the substrate and the peel layer.

10. The transfer sheet according to claim 8, wherein the transfer layer contains a colorant.

11. The transfer sheet according to claim 8, wherein the total amount of the silicone oil and the wax component in the peel layer is 1 mass % or more and 10 mass % or less, based on the solid content of mass of the binder resin.

12. The transfer sheet according to claim 1, further comprising a release layer between the substrate and the peel layer.

13. The transfer sheet according to claim 12, wherein the transfer layer contains a colorant.

14. The transfer sheet according to claim 12, wherein the total amount of the silicone oil and the wax component in the peel layer is 1 mass % or more and 10 mass % or less, based on the solid content of mass of the binder resin.

15. The transfer sheet according to claim 1, wherein the transfer layer contains a colorant.

16. The transfer sheet according to claim 15, wherein the total amount of the silicone oil and the wax component in the peel layer is 1 mass % or more and 10 mass % or less, based on the solid content of mass of the binder resin.

17. The transfer sheet according to claim 1, wherein the total amount of the silicone oil and the wax component in the peel layer is 1 mass % or more and 10 mass % or less, based on the solid content of mass of the binder resin.

18. The transfer sheet according to claim 1, wherein the total amount of the silicone oil and the wax component in the peel layer is 4 mass % or more and 9 mass % or less, based on the solid content of mass of the binder resin.

* * * * *